United States Patent Office 3,552,906
Patented Jan. 5, 1971

3,552,906
PROCESS FOR DYEING AND PRINTING LINEAR POLYESTER FIBERS AND SAID DYED FIBERS
Visvanathan Ramanathan and Richard Peter, Basel, and Hans-Joerg Angliker, Riehen, Switzerland, assignors to Ciba Limited, Basel, Switzerland, a company of Switzerland
No Drawing. Filed Jan. 3, 1968, Ser. No. 695,336
Claims priority, application Switzerland, Jan. 10, 1967, 299/67
Int. Cl. D06p 1/02
U.S. Cl. 8—41
9 Claims

ABSTRACT OF THE DISCLOSURE

Linear polyester fibers dyed and process for dyeing or printing linear polyester fibers with a water insoluble azo dyestuff of the formula

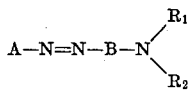

in which A represents a thiazole, benzthiazole or thiadiazole radical bound in the 2-position to the azo group or a benzene radical which may be substituted, $R_1$ denotes an alkyl group which may be substituted and $R_2$ denotes a residue of the formula —alkylene—$OCOR_3$, in which $R_3$ represents a residue which contains a nitrogen-containing 6-membered ring.

---

This invention is based on the observation that valuable dyeings and prints can be obtained on hydrophobic fibrous material made of or containing, for example cellulose esters for example cellulose 2½-acetate or cellulose triacetate, aromatic polyesters, especially polyethylene terephthalate, polyamides, polyurethanes, polyacrylonitrile or polyvinyl chloride, when water-insoluble azo dyestuffs of formula

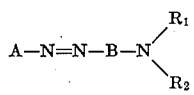

are used wherein A denotes the residue of a diazo component, B a phenylene residue which may be substituted, $R_1$ an alkyl group which may be substituted and $R_2$ a residue of the formula —alkylene—O—$COR_3$, in which $R_3$ represents a nitrogen-containing 6-membered residue.

The dyestuffs to be used in accordance with the process preferably correspond to the formula

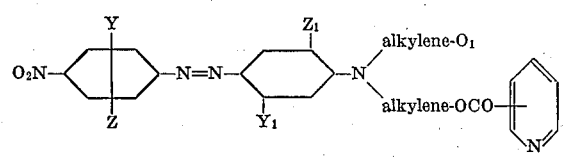

wherein Y denotes a hydrogen or halogen atom, or an alkyl, alkoxy, phenoxy, nitro, nitrile, carbalkoxy or alkylsulphonyl group, Z denotes a hydrogen or halogen atom or an alkyl, nitrile or trifluoromethyl group, $Y_1$ denotes a hydrogen or halogen atom or an alkyl, alkoxy, aryloxy or acylamino group, $Z_1$ denotes a hydrogen atom or an alkyl or alkoxy group, and $X_1$ denotes a hydrogen atom or an alkoxy, cyanoalkoxy, carbalkoxy, phenyl or nitrile group or an alkanoyloxy group.

Such dyestuffs are described in French patent specification No. 1,464,401 (Case 5612) and may be obtained from the corresponding components by coupling.

Dyestuffs of particular interest are those of formula

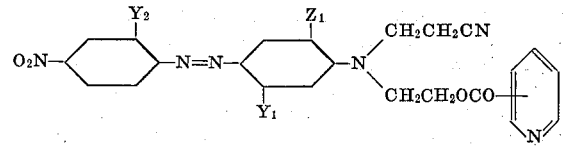

wherein $Y_2$ denotes a halogen atom or a nitrile group, and $Y_1$ and $Z_1$ have the significance already mentioned.

In certain cases it may be advantageous to use mixtures of two or more of the dyestuffs to be used according to the process of the invention.

For dyeing purposes, the dyestuffs are advantageously used in a finely divided form and dyeing is carried out with the addition of dispersing agents, for example sulphite cellulose waste lye or synthetic detergents or a combination of different wetting and dispersing agents. As a rule it is advantageous to convert the dyestuffs used, before dyeing, into a dyeing preparation which contains a dispersing agent and the finely divided dyestuff in such a form that on dilution of the dyestuff preparations with water a fine dispersion is obtained. Such dyestuff preparations can be obtained in known manner, for example by grinding the dyestuff in a dry or wet form, with or without addition of dispersing agents during the grinding process.

In order to obtain strong dyeings on polyethylene terephthalate fibres it is advantageous to add a swelling agent to the dye bath or to carry out the dyeing process under pressure at temperatures above 100°, for example at 120°. Suitable swelling agents are aromatic carboxylic acids, for example benzoic acid or salicylic acid, phenols, for example o-hydroxydiphenyl or p-hydroxydiphenyl, aromatic halogen compounds, for example chlorobenzene, o-dichlorobenzene or trichlorobenzene, phenylmethylcarbinol or diphenyl. When dyeing under pressure it is advantageous to render the dye bath weakly acid, for example by adding a weak acid, for example acetic acid.

The dyestuffs to be used according to the invention are particularly suitable for dyeing by the so-called thermofixing process, according to which the fabric to be dyed is impregnated with an aqueous dispersion of the dyestuff which advantageously contains 1 to 50% of urea and a thickener, especially sodium alginate, preferably at temperatures of at most 60°, and squeezed out in the usual manner. It is advantageous to squeeze the fabric in such a way that the impregnated goods retain 50 to 100% by weight of the dyeing liquid based on the weight of the material to be dyed.

In order to fix the dyestuff the fabric impregnated in this way is heated to temperatures of above 100°, for example between 180 and 210°, advantageously after a preliminary drying, for example in a stream of warm air.

The thermofixing process just referred to is of particular interest for dyeing mixed fabrics of polyester fibres and cellulose fibres, especially cotton. In this case the padding liquid, in addition to the dyestuff to be used according to the invention, also contains a dyestuff suitable for dyeing cotton, for example direct dyestuffs or vat dyestuffs, or especially the so-called reactive dyestuffs i.e. dyestuffs which can be fixed to cellulose fibre with the formation of a chemical bond, for example dyestuffs containing a chlorotriazine or chlorodiazine residue. In the latter case it is advantageous to add an acid-binding reagent, for example an alkali metal carbonate or alkali metal phosphate, alkali metal borate or alkali metal perborate or a mixture thereof, to the padding solution. When using vat dyestuffs it is necessary to treat the padded fabric, after the heat treatment, with an aqueous alkaline solution of a reducing agent generally used in vat dyeing.

The dyeings obtained on polyester fibres in accordance with the present process are advantageously subjected to an after treatment, for example by heating with an aqueous solution of a non-ionic detergent.

The present invention is also suitable for dyeing mixed fabrics of polyester fibres and wool, wherein the wool component remains reserved and can subsequently be dyed with a wool dyestuff.

According to the present process the dyestuff specified may also be applied by printing instead of by impregnation. For this purpose a printing paste for example is used which in addition to the usual printing auxiliary substances, for example wetting agents and thickeners, contains the finely dispersed dyestuff, mixed if required with one of the above-mentioned cotton dyestuffs, and optionally in the presence of urea and/or an acid-binding reagent.

The present process yields strong dyeings and prints of excellent fastness properties, particularly good fastness to light, sublimation, decatising, washing and chlorine water. The dyings on acetate rayon are furthemore distinguished by good fastness to gas. A further advantage resides in the good wool and cotton reserving properties of the dyestuffs to be used in accordance with the process.

In the examples which follow the parts, unless otherwise stated, denote parts by weight, the percentages denote percentages by weight and the temperatures are given in degrees centigrade.

EXAMPLE 1

0.5 part of the dyestuff of formula

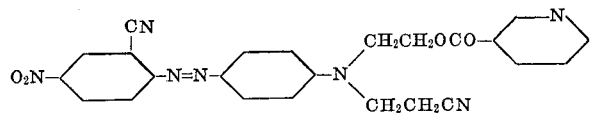

is ground to a fine dispersion with 0.5 part of 2,2'-dinaphthylmethane disulphonic acid. This dispersion is added to a dye bath which contains 3 parts of glacial acetic acid and 3 parts of N-benzyl-ω-heptadecyl-benzimidazole sulphonic acid in 3,000 parts of water. Into this dye bath 100 parts of well-wetted acetate rayon are introduced at 40°, the temperature is raised to 80°, and dyeing is carried out for 1 hour at 80°. The acetate rayon is dyed a strong red shade distinguished by good fastness to light and sublimation.

EXAMPLE 2

1 part of the dyestuff used in Example 1 worked into a paste with a fatty alcohol-ethylene oxide condensation product is diluted to 4,000 parts with water, and 1.6 parts of glacial acetic acid and a further 1 part of a fatty alcohol-ethylene oxide condensation product are added. 100 parts of cellulose triacetate fabric are introduced into this dye bath at 30°, the bath raised to boiling, and dyeing is carried out for 1 hour at the boiling point. A red dyeing of good fastness to light and sublimation is obtained.

EXAMPLE 3

1 part of the dyestuff used in Example 1 is ground wet with 2 parts of a 50% aqueous solution of the sodium salt of 1,1'-dinaphthylmethane-2,2'-disulphonic acid and dried.

This dyestuff preparation is stirred with 40 parts of a 10% aqueous solution of the sodium salt of N-benzyl-μ-heptadecylbenzimidazole disulphonic acid and 4 parts of 40% acetic acid are added. 4,000 parts of a dye bath are prepared therefrom by dilution with water.

100 parts of a cleaned polyester fibre material are introduced into this bath at 50°, the temperature is raised to 120–130° in ½ hour, and dyeing is carried out for 1 hour at this temperature with the vessel closed. Thereafter the material is thoroughly rinsed. A strong red dyeing of excellent fastness to light and sublimation is obtained.

In the table which follows, a number of further dyestuffs is given in Column I which dye polyethylene terephthalate fibres by the process described above to give the shades given in Column II.

| | I | II |
|---|---|---|
| 7 | O₂N—C₆H₄—N=N—C₆H₄—N(C₂H₅)(C₂H₄OCO-piperidyl) | Scarlet. |
| 8 | O₂N—C₆H₃(Br)—N=N—C₆H₄—N(C₂H₄OCOCH₃)(C₂H₄OCO-piperidyl) | Do. |
| 9 | O₂N—C₆H₂(Cl)(Cl)—N=N—C₆H₄—N(C₂H₄COOC₂H₅)(C₂H₄OCO-piperidyl) | Brown. |
| 10 | O₂N—C₆H₂(Cl)(Cl)—N=N—C₆H₄—N(C₂H₄CN)(C₂H₄OCO-piperidyl) | Do. |
| 11 | O₂N—C₆H₃(COOCH₃)—N=N—C₆H₄—N(C₂H₄OC₂H₄CN)(C₂H₄OCO-piperidyl) | Red. |
| 12 | O₂N—C₆H₃(NO₂)—N=N—C₆H₃(Cl)—N(C₂H₄OC₂H₄CN)(C₂H₄OCO-piperidyl) | Do. |
| 13 | O₂N—C₆H₃(SO₂CH₃)—N=N—C₆H₃(CH₃)—N(C₂H₄CN)(C₂H₄OCO-piperidyl) | Do. |
| 14 | C₂N—C₆H₂(CN)(Br)—N=N—C₆H₄—N(C₂H₄CN)(C₃H₆OCO-piperidyl) | Claret. |
| 15 | O₂N—C₆H₂(NO₂)(Cl)—N=N—C₆H₂(OCH₃)(NHCOCH₃)—N(C₂H₄OCO-piperidyl)₂ | Blue. |
| 16 | CH₃SO₂—C₆H₃(Cl)—N=N—C₆H₃(NHCOC₂H₅)—N(C₂H₄CN)(C₂H₄OCO-piperidyl) | Red. |
| 17 | O₂N—C₆H₃(Cl)—N=N—C₆H₄—N(C₂H₅)(C₂H₄OCO-piperidyl) | Do. |
| 18 | O₂N—C₆H₃(CN)—N=N—C₆H₄—N(C₂H₄COOC₂H₅)(C₂H₄OCO-piperidyl) | Ruby. |
| 19 | O₂N—C₆H₃(Cl)—N=N—C₆H₄—N(C₂H₄COOC₂H₅)(C₂H₄OCO-piperidyl) | Red. |
| 20 | O₂N—C₆H₂(Cl)(Cl)—N=N—C₆H₄—N(C₂H₄OC₂H₄CN)(C₂H₄OCO-piperidyl) | Brown. |

| | I | II |
|---|---|---|
| 21 | $O_2N$-⬡(CN)-N=N-⬡-N($C_2H_4OC_2H_4CN$)($C_2H_4OCO$-⬡-N) | Claret. |
| 22 | $(CH_3)_2NO_2S$-⬡(Cl)(Cl)-N=N-⬡-N($C_2H_4O$-⬡)($C_2H_4OCO$-⬡-N) | Scarlet. |
| 23 | $O_2N$-⬡(O-⬡)-N=N-⬡(NHSO$_2$CH$_3$)-N($C_2H_4OCO$-⬡-N)$_2$ | Red. |
| 24 | $O_2N$-⬡[N,S benzothiazole]-C-N=N-⬡(OCH$_3$)-N($C_2H_4COOCH_3$)($C_2H_4OCO$-⬡-N) | Claret. |
| 25 | $O_2N$-⬡[N,S]-C-N=N-⬡-N($C_2H_4CN$)($C_2H_4OCO$-⬡-N) | Red. |
| 26 | NC-⬡[N,S]-C-N=N-⬡(NHCOOC$_2$H$_5$)-N($C_2H_4OCO$-⬡-N)$_2$ | Reddish violet. |
| 27 | $CH_3SO_2$-⬡[N,S]-C-N=N-⬡(CF$_3$)-N($C_2H_4OCH_3$)($C_2H_4OCO$-⬡-N) | Red. |
| 28 | $CH_3OOC$-⬡[N,S]-C-N=N-⬡(OC$_2$H$_5$)-N(CH$_2$-⬡)($C_2H_4OCO$-⬡-N) | Ruby. |
| 29 | $O_2N$-C[HC=N,S thiadiazole]-C-N=N-⬡-N($C_2H_4CN$)($C_3H_6OCO$-⬡-N) | Violet. |
| 30 | NC-C[HC=N,S]-C-N=N-⬡-N($C_2H_4OCOC_2H_5$)($C_2H_4OCO$-⬡-N) | Do. |
| 31 | $O_2N$-C[HC=N,S]-C-N=N-⬡-N($C_2H_4CN$)($C_2H_4OCO$-⬡-N) | Do. |
| 32 | $CH_3SO_2$-C[HC=N,S]-C-N=N-⬡(CH$_3$)-N($C_2H_4OC_2H_4CN$)($C_2H_4OCO$-⬡-N) | Do. |
| 33 | ⬡-C[N=C,S thiadiazole]-C-N=N-⬡(Cl)-N($C_2H_4CN$)($C_2H_4OCO$-⬡-N) | Do. |

| I | | II |
|---|---|---|
| 34. CH₃SO₂—C—N / N—S—C—N=N—⟨cyclohexane⟩—N(C₂H₄CN)(C₂H₄OCO—Pyr) | | Red. |
| 35. CH₃—C—C—NO₂ / N—S—C—N=N—⟨cyclohexane⟩—N(C₂H₄CN)(C₂H₄OCO—Pyr) | | Violet. |
| 36. O₂N—C—HC—N / S—C—N=N—⟨cyclohexane⟩—N(CH₂CH₂—Pyr)(C₂H₄OCO—Pyr) | | Do. |

EXAMPLE 4

100 parts of polyethylene terephthalate fibre material are cleaned for ½ hour in a bath which contains 1 to 2 parts of the sodium salt of N-benzyl-μ-heptadecylbenzimidizole disulphonic acid and 1 part of concentrated aqueous ammonia solution in 1,000 parts of water. Thereafter the material is treated for 15 minutes at 50° in a dyebath which contains 9 parts of diammonium phosphate and 1.5 parts of the sodium salt of N-benzyl-μ-heptadecyl-benzimidazole disulphonic acid in 3,000 parts of water. 9 parts of sodium o-phenylphenolate are then dissolved, gradually added to the dye bath and the uptake of the liberated o-phenylphenol is effected by agitating the textile material for 15 minutes at 50 to 55°. The dyestuff preparation obtained in accordance with Example 3, paragraph 1 is then added. The bath is now raised to boiling point within ½–¾ hour and dyeing carried out for 1 to 1½ hours as close to the boiling point as possible. Thereafter the material is thoroughly rinsed and if desired washed for ½ an hour at 60 to 80° with a solution which contains 1 part of the sodium salt of N-benzyl-μ-heptadecylbenzimidazole disulphonic acid in 1,000 parts of water. A red dyeing of excellent fastness to sublimation and light is obtained.

EXAMPLE 5

100 parts of a mixed fabric consisting of 50 parts of polyethylene terephthalate fibres and 50 parts of wool are introduced at 50° into a bath which contains 5 parts of a 75% aqueous emulsion of methyl salicylate as an accelerator, 1 part of the sodium salt of diisobutylnaphthalene sulphonic acid and 10 parts of the dyestuff used in Example 1 in 1,000 parts of water. The bath is then raised to boiling within 1 hour, boiled for 1½ to 2 hours, and the dyed material is thoroughly rinsed with warm water. Subsequent cleaning is not necessary. The polyester component is dyed a strong red whilst the wool component is reserved almost white.

EXAMPLE 6

The following are mixed to form a stock thickener:

| | Parts |
|---|---|
| Gum arabic (1:1) | 300 |
| Crystal gum (1:2) | 300 |
| Water | 250 |
| Cyclohexane | 40 |
| Thiodiglycol | 40 |
| 10% solution of the sodium salt of m-nitrobenzene-sulphonic acid | 50 |
| Mixture of potassium oleate and pine oil | 20 |
| Total | 1000 |

200 parts of the dyestuff preparation obtained according to Example 3, paragraph 1 are stirred into 800 parts of this stock thickener by means of a rapid stirrer until completely dispersed. Polyethylene terephthalate fabric is printed with this paste. After printing the fabric is dried and steamed for 45 minutes at ¾ atmosphere excess pressure, rinsed in cold water for 10 minutes, centrifuged and dried. A fast red print is obtained.

EXAMPLE 7

200 parts of urea are dissolved in 400 parts of water. 100 parts of an aqueous dispersion containing 30 parts of the dyestuff used in Example 1 and 2 parts of the sodium salt of diisobutylnaphthalene sulphonic acid are poured into this solution, and the batch thoroughly mixed for a few minutes in a rapid stirrer, 100 parts of a 20% sodium carbonate solution and 400 parts of a 5% sodium alginate solution being added at the same time.

A polyethylene terephthalate fabric is padded with the padding solution so obtained at 50 to 60° in such a way that the impregnated goods retain 65 to 70% of dyestuff solution based on the weight of the material to be dyed, dried and subsequently subjected to a heat treatment for 1 minute at 200–210°.

Thereafter the material is washed at the boil for 20 minutes in a solution containing 2 g./l. of a non-ionic detergent and 2 g./l. of calcined sodium carbonate, rinsed and dried. A strong red dyeing having very good fastness properties is obtained.

EXAMPLE 8

1 part of dyestuff preparation is stirred with 100 parts of a 10% aqueous solution of a condensation product of octadecyl alcohol and 20 mols of ethylene oxide and 4,000 parts of a dye bath are prepared by dilution with water.

100 parts of a polyamide fabric are introduced into the cold bath, the temperature is raised to 90° in ½ hour, and dyeing carried out for 1 hour at this temperature. A claret dyeing of good fastness to light and washing is obtained.

We claim:
1. A process for dyeing or printing linear polyester fibers which comprises contacting said fibers at a temperature from 100°–210° C. with a water-insoluble azo dyestuff of the formula

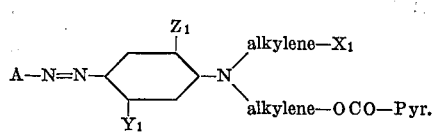

in which A represents a thiazole, benzthiazole or thiadiazole radical bound in the 2-position to the azo group or a benzene radical, $Y_1$ denotes a hydrogen, chlorine, bromine, a lower alkyl, lower alkoxy, phenoxy or lower alkanoylamino group, $Z_1$ denotes a hydrogen, a lower alkyl or lower alkoxy group, and $X_1$ denotes a hydrogen, a lower alkoxy, cyanoethoxy, lower carbalkoxy, phenyl, cyano or a lower alkanoyloxy group and Pyr. represents a pyridine radical bound in 2-, 3- or 4-position to the carbonyl group.

2. A process according to claim 1 wherein A is a group of the formula

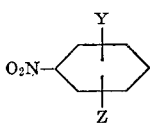

wherein Y is a hydrogen, chloro, bromo, a lower alkyl, lower alkoxy, phenoxy, nitro, cyano, lower carbalkoxy or lower alkylsulphonyl group, and wherein Z is a hydrogen, chloro, bromo, a lower alkyl, cyano or trifluoromethyl group.

3. A process as claimed in claim 2 wherein a dyestuff of the formula

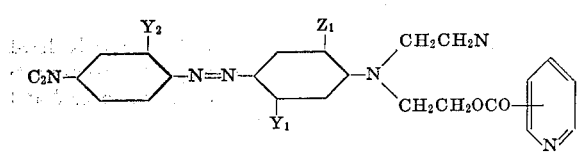

is used, in which $Y_2$ denotes chloro, bromo or cyano group.

4. Linear polyester fibers dyed with a dyestuff of the formula

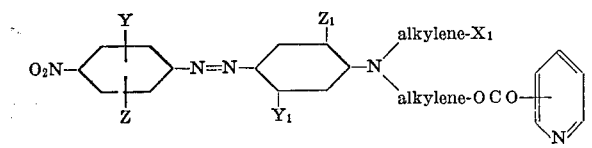

5. Linear polyester fibers dyed with a dyestuff of the formula

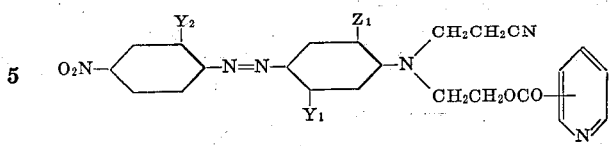

in which $Y_2$ denotes chloro, bromo or a cyano group and $Y_1$ and $Z_1$ have the significance given in claim 4.

6. Polyethylene terephthalate fibers dyed with a dyestuff of the formula

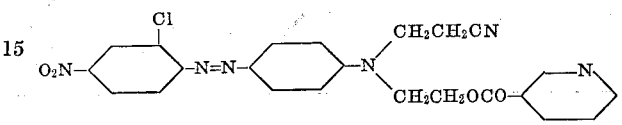

7. Polyethylene terephthalate fibers dyed with a dyestuff of the formula

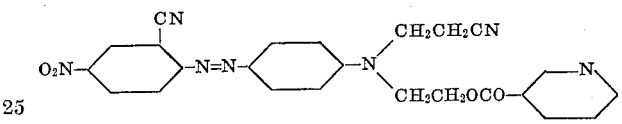

8. Polyethylene terephthalate fibers dyed with a dyestuff of the formula

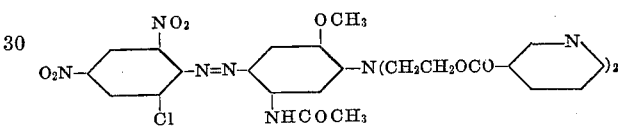

9. Polyethylene terephthalate fibers dyed with a dyestuff of the formula

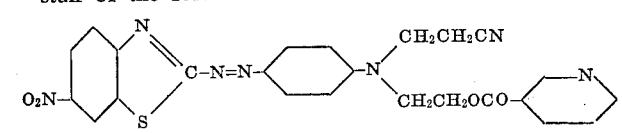

References Cited
FOREIGN PATENTS
1,464,401  11/1966  France _____ 8—41

GEORGE F. LESMES, Primary Examiner

P. C. IVES, Assistant Examiner

U.S. Cl. X.R.

260—156, 158

PO-1050
(5/69)

UNITED STATES PATENT OFFICE
CERTIFICATE OF CORRECTION

Patent No. 3,552,906            Dated January 5, 1971

Inventor(s)  Visvanathan Ramanathan et al

It is certified that error appears in the above-identified patent and that said Letters Patent are hereby corrected as shown below:

Column 11, claim 3, left-hand portion of structural formula should read -- $O_2N-$ --.

Column 11, claim 4, after the structural formula should read

-- in which Y denotes a hydrogen, chloro, bromo, a lower alkyl, lower alkoxy, phenoxy, nitro, cyano, lower carbalkoxy or lower alkylsulphonyl group, Z denotes a hydrogen, chloro, a lower alkyl, cyano or trifluoromethyl group, $Y_1$ denotes a hydrogen, chloro, bromo, a lower alkyl, lower alkoxy, phenoxy or lower alkanoylamino group, $Z_1$ denotes a hydrogen atom or lower alkyl or lower alkoxy group, and $X_1$ denotes a hydrogen atom, or a lower alkoxy, cyanoethoxy, lower carbalkoxy, phenoxy or cyano group or a lower alkanoyloxy group. --

Signed and sealed this 21st day of December 1971.

(SEAL)
Attest:

EDWARD M. FLETCHER, JR.
Attesting Officer

ROBERT GOTTSCHALK
Acting Commissioner of Patent